J. THOMPSON.
Rotary Cultivator.
No. 109,273.
Patented Nov. 15, 1870.
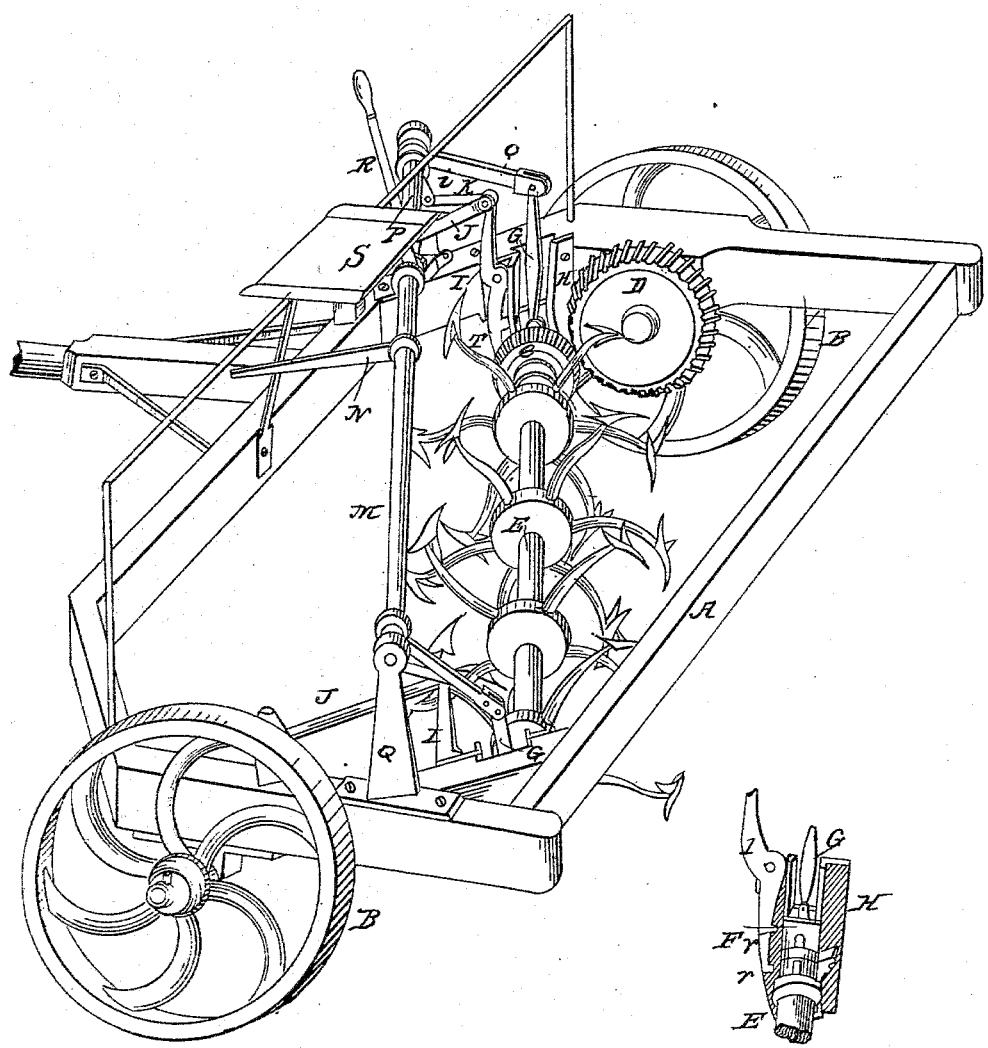

UNITED STATES PATENT OFFICE.

JOHN THOMPSON, OF LOUISVILLE, KENTUCKY.

IMPROVEMENT IN ROTARY PULVERIZERS.

Specification forming part of Letters Patent No. 109,273, dated November 15, 1870.

*To all whom it may concern:*

Be it known that I, JOHN THOMPSON, of the city of Louisville, county of Jefferson, and State of Kentucky, have invented a certain new and useful improvement in rotary pulverizers for the purpose of reducing rough land to a suitable degree of smoothness preparatory to sowing or planting any seed the farmer may desire to put therein, of which the following is a specification.

The first part of my invention consists in a rotary harrow or pulverizer placed diagonally in the frame, operated by bevel-gearing propelled by the driving-wheels of the machine.

Said pulverizer consists of a horizontal shaft provided with four heads or flanges keyed on at equal distances apart, the above flanges each being provided with six teeth or pulverizers secured to them by bolts or otherwise, the points of the teeth being slightly bent in the direction in which they turn, and made similar in shape to that of a small cultivator-tooth, one of which in each flange is set off to the right, the next remaining straight, while the next one is set off to the left, and so on in like manner until all are thus arranged, by means of which and the diagonal position of the pulverizer in the frame I secure uniform action on all parts of the surface of the land as it passes over it.

The second part of my invention consists in the arrangement of the device for raising and lowering the pulverizer, which is accomplished by links secured to the upper part of the journal-boxes of the pulverizer, connecting with small arms on a shaft above, by which they are operated by means of a lever on said shaft; but, in order to hold the pulverizer permanently in any desired position, there are small levers secured to the sides of the journal-box guides, on the insides of which there are two or more small teeth or catches extending through the side of the flange of the guide-box and entering the side of the journal-box, and thereby holding them securely in their places by means of a spring, on top of the frame, taking hold of the upper end of the catch lever, pressing it up firmly. These catch-levers are operated by means of small links connecting them with small arms on the ends of a pipe passing over a shaft that operates the pulverizer, said pipe having a lever near the center operated by the foot of the driver.

Having thus fully described the nature of my invention, its construction and operation will be more fully explained by reference to the drawings.

Figure 1 is a perspective view of the machine. Fig. 2 is a view of the guide and journal-box, showing the catch-levers and how the catches enter the side of the guide-box.

A is the frame of the machine, which frame should be substantially constructed of good seasoned lumber. B B are the driving-wheels. E is the pulverizer. C and D are the cog-wheels which drive it. F is the journal-box. H H are the guide-boxes in which they work. I I are the catch-levers; T T, the catches. J J are the springs. K K are the links. L is the arm. M is the pipe-shaft, and N the foot-lever by which it is operated, transmitting motion to the catch-levers. G G are the links of the journal-boxes. O O are the arms. P is the shaft. Q Q are the stands, and R is the lever by which the pulverizer is raised and lowered. S is the driver's seat. Therefore

I claim as my invention—

The combination of the pulverizer E, the gearing by which it is rotated, and the several devices for adjusting and maintaining it in position, all constructed, arranged, and operating substantially as herein described.

JOHN THOMPSON.

Witnesses:
    EDWD. FULTON,
    E. F. HUYCK.